United States Patent
Cohen et al.

(10) Patent No.: US 10,498,469 B2
(45) Date of Patent: Dec. 3, 2019

(54) ON-CHIP JITTER TOLERANCE TESTING

(71) Applicant: Intel Corporation, Santa Clara, CA (US)

(72) Inventors: Mor Cohen, Haifa (IL); Amir Mezer, Haifa (IL); Golan Perry, Haifa (IL); Adee Ofir Ran, Maayan Baruch (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/985,136

(22) Filed: May 21, 2018

(65) Prior Publication Data

US 2019/0044627 A1    Feb. 7, 2019

(51) Int. Cl.
| | |
|---|---|
| *H03K 9/00* | (2006.01) |
| *H04B 17/29* | (2015.01) |
| *H04L 12/26* | (2006.01) |
| *H04B 1/16* | (2006.01) |

(52) U.S. Cl.
CPC ............... *H04B 17/29* (2015.01); *H04B 1/16* (2013.01); *H04L 43/087* (2013.01); *H04L 43/0823* (2013.01); *H04L 43/50* (2013.01)

(58) Field of Classification Search
CPC .......... H04B 17/29; H04B 1/16; H04L 43/087
USPC .......................................................... 375/316
See application file for complete search history.

(56) References Cited

U.S. PATENT DOCUMENTS

| | | | |
|---|---|---|---|
| 9,374,202 B2 | 6/2016 | Ran et al. | |
| 2009/0189667 A1* | 7/2009 | Ichiyama | G01R 31/31709 327/261 |
| 2013/0301691 A1* | 11/2013 | Wang | H04B 17/14 375/221 |
| 2014/0098843 A1* | 4/2014 | Kong | G01R 31/31709 375/219 |
| 2016/0056827 A1* | 2/2016 | Vlachogiannakis | H03B 5/1265 327/158 |
| 2016/0218734 A1* | 7/2016 | Malipatil | H03M 1/183 |

\* cited by examiner

*Primary Examiner* — Helene E Tayong
(74) *Attorney, Agent, or Firm* — Lowenstein Sandler LLP

(57) ABSTRACT

In accordance with embodiments disclosed herein, there is provided systems and methods for on-chip jitter tolerance testing. A receiver component includes a clock data recovery (CDR) logic circuit. The CDR logic circuit includes a controller to receive a phase signal and to output a DCO control signal; jitter injection (JINJ) logic to generate a first jitter signal at a first frequency and a first amplitude; and digitally controlled oscillator (DCO) to receive the first jitter signal applied to the DCO control signal and to output, based on the first jitter signal applied to the DCO control signal, a first DCO clock signal for on-chip jitter tolerance testing.

20 Claims, 11 Drawing Sheets

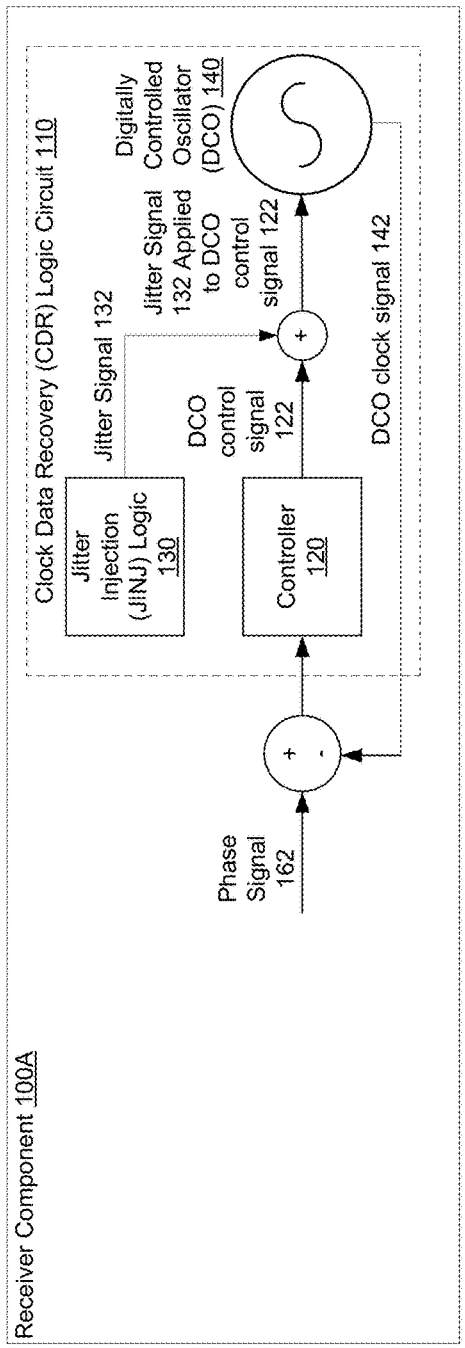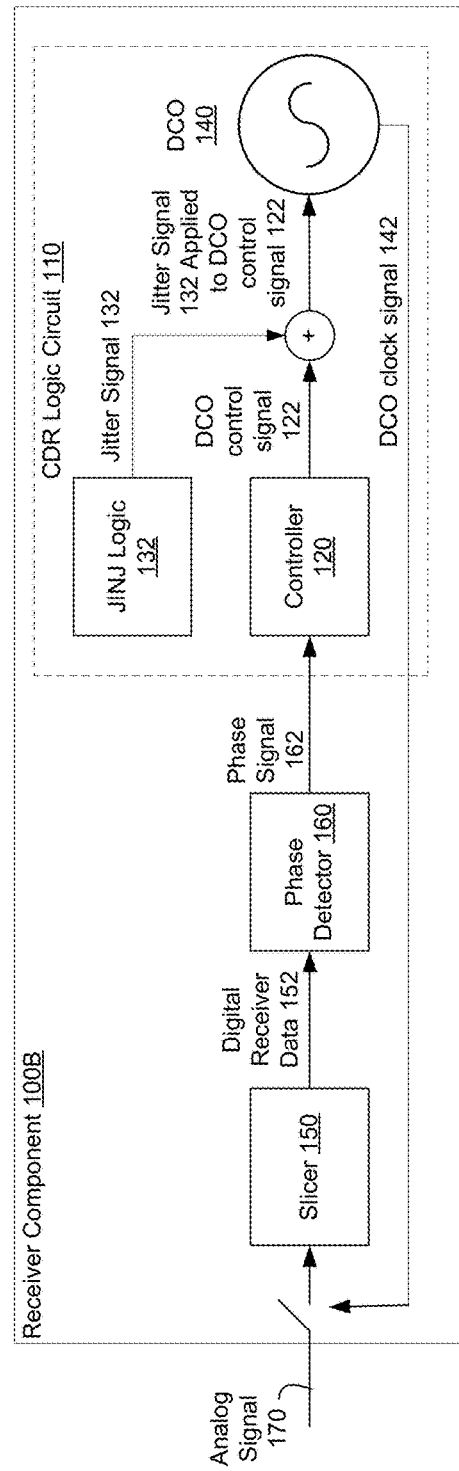

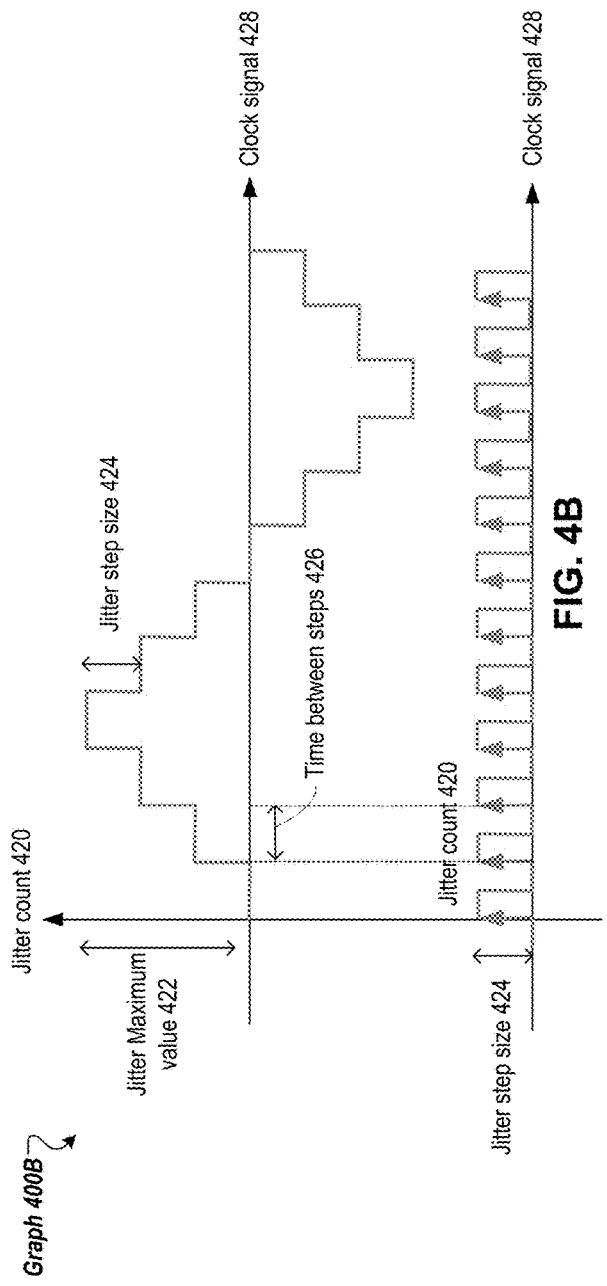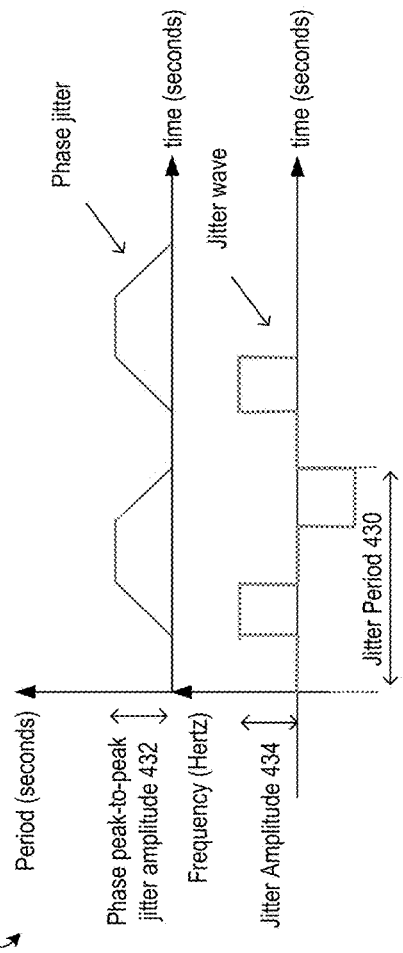
FIG. 4B
FIG. 4C

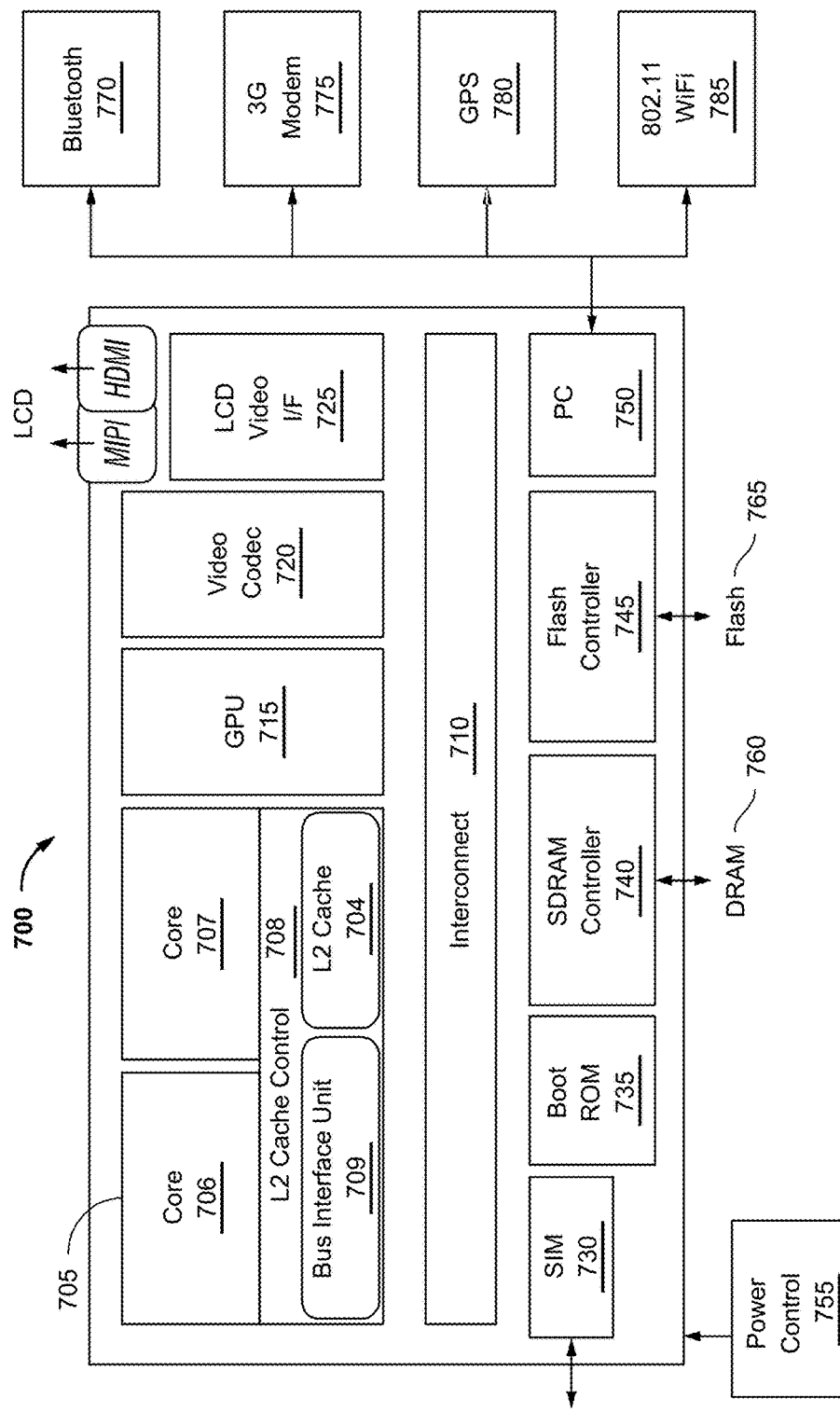

ON-CHIP JITTER TOLERANCE TESTING

BRIEF DESCRIPTION OF THE DRAWINGS

FIG. 1A illustrates a receiver component that includes jitter injection (JINJ) logic, according to certain embodiments.

FIG. 1B illustrates a receiver component that includes JINJ logic, according to certain embodiments.

FIG. 4B is a graph illustrating a jitter signal, according to certain embodiments.

FIG. 4C is a graph illustrating a jitter signal, according to certain embodiments.

FIG. 7 illustrates a system on a chip (SOC) design, according to one embodiment.

DESCRIPTION OF EMBODIMENTS

Figure 2:
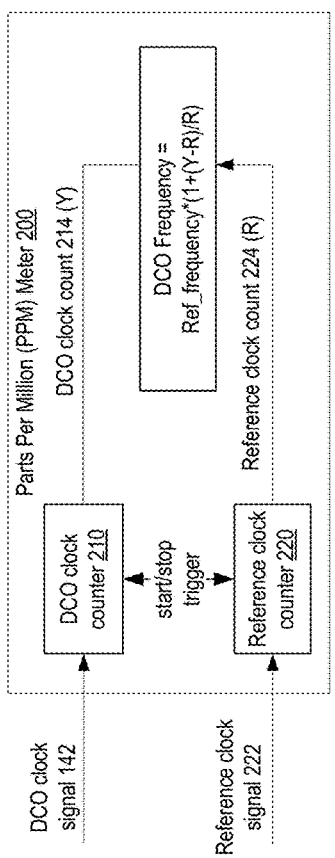
FIG. 2 illustrates a parts per million (PPM) meter, according to certain embodiments.

Described herein are technologies directed to on-chip jitter tolerance testing. In general, a system may include a transmitter component and a receiver component. The transmitter component may transmit data signals to the receiver component. The data signals may be periodic signals in relation to a reference clock signal (e.g., of the transmitter component). Deviations from true periodicity of the periodic signal are referred to as jitter. High-speed physical layer (PHY) standards include requirements for receiver components to meet a Jitter Tolerance Test (JTT).

To conduct a JTT, external test equipment may be used to create jitter stress conditions defined by a standard. The external test equipment may be used as the transmitter component to test the receiver component. Use of external test equipment is costly and is not protocol agnostic. Some standards require specific patterns and/or methods that external equipment may not support (e.g., training, Pulse Amplitude Modulation 4 (PAM4), Forward Error Correction (FEC) encoding, etc.). Some standards require operation across several lanes which external equipment may not support. In some specifications (e.g., Peripheral Component Interconnect (PCI) Express (PCIe®)), jitter tolerance measurements are to be performed on fully functional system (e.g., the transmitter component of the system transmitting data signals to a receiver component of the system). External equipment cannot be used to conduct a JTT on a fully functional system.

The devices, systems, and methods, as disclosed herein, provide on-chip jitter tolerance testing. A receiver component includes a controller, jitter injection (JINJ) logic, and a digitally controlled oscillator (DCO). The controller may receive a phase signal and may output a DCO control signal. The JINJ logic may generate a first jitter signal at a first frequency and a first amplitude. The DCO may receive the first jitter signal applied to the DCO control signal and may output a first DCO clock signal for on-chip jitter tolerance testing.

The JINJ logic may add jitter to the DCO control signal with several patterns, at tunable amplitudes and frequencies. For example, responsive to first user input, the JINJ logic may generate a first jitter signal of a first pattern, first amplitude, and a first frequency. Responsive to second user input, the JINJ logic may generate a second jitter signal of a second pattern, second amplitude, and a second frequency.

The on-chip jitter tolerance testing may be protocol-independent and calibrated. The receiver component may include a parts per million (PPM) meter to calibrate the injected jitter. The on-chip jitter tolerance testing may be performed without external testing equipment. The JINJ logic may generate jitter signals, where each jitter signal is a respective periodical pattern with amplitude and frequency control. Since the jitter is calibrated, the results may be highly repeatable on the same device and across devices. The on-chip jitter tolerance testing may be performed on a fully functional system (e.g., based on an analog signal received from a transmitter component).

Amplitude of the jitter signal may be controlled and margins may be read internally (e.g., using firmware) instead of using external equipment. The JINJ logic may be used to create two-dimensional jitter and voltage margin plots (e.g., jitter tolerance eye diagram) which a user or a test method may require. The JINJ logic may allow testing jitter tolerance in parallel process parameter variation (PPV) setups and high volume manufacturing (HVM) tester equipment.

FIGS. 1A-B illustrate receiver components 100A-B (hereinafter "receiver component 100") that include jitter injection (JINJ) logic 130, according to certain embodiments. The receiver component 100 may include a clock data recovery (CDR) logic circuit 110. The CDR logic circuit 110 may generate a clock signal (e.g., DCO clock signal 142) (e.g., adjust phase of a clock signal) to phase-align the clock signal to the transitions in the data stream (e.g., analog signal 170 of FIG. 1B).

The receiver component 100 may include a controller 120, JINJ logic 130, and a digitally controlled oscillator (DCO) 140. In some embodiments, the CDR logic circuit 110 includes one or more of the controller 120, the JINJ logic 130, or the DCO 140.

In some embodiments, the controller 120 is a proportional integral (PI) controller. In some embodiments, the controller 120 is a loop filter. The controller 120 may receive a phase signal 162 and may generate a DCO control signal 122 based on the phase signal 162.

The JINJ logic 130 may generate a jitter signal 132 (e.g., controlled interference, a jitter injection output signal) to apply to the DCO control signal 122 (e.g., to superimpose on the DCO control signal 122). The jitter signal 132 may be a frequency interference and the actual jitter signal may be an integral in time of the jitter signal 132, which may also be periodical. For example, a staircase signal may create a piecewise-linear phase jitter which can be used as an approximation of sinusoidal jitter. In some embodiments, the jitter signal 132 is a 9-bit signed digital signal sampled at a high frequency (e.g., from a few hundred megahertz (MHz) up to 2 gigahertz (GHz). The jitter signal 132 may be applied to the DCO control signal 122 as frequency interference. In some embodiments, the jitter signal 132 is applied to the DCO control signal 122 by analog addition (e.g., dedicated DCO control). In some embodiments, the jitter signal 132 is applied to the DCO control signal 122 by digital addition (e.g., internal to the CDR logic circuit 110). The interference parameters of the jitter signal 132 may be set by registers (e.g., via user input, via software, via a user interface). Instead of using external equipment that has a controllable transmitter to inject a jitter signal, any transmitter component can be used with receiver component 100, where receiver component 100 includes JINJ logic 130 to inject a jitter signal 132.

The JINJ logic 130 may generate jitter signals 132 (e.g., including jitter signals that external equipment can generate for jitter-tolerance testing), where each jitter signal 132 has a pattern selected from a set of patterns, has an amplitude selected from a set of tunable amplitudes, and has a frequency selected from a set of tunable frequencies. For example, responsive to first user input, the JINJ logic 130 may generate a first jitter signal 132A of a first pattern, first amplitude, and a first frequency. Responsive to second user input, the JINJ logic 130 may generate a second jitter signal 132B of a second pattern, second amplitude, and a second frequency. In some embodiments, responsive to user input, the JINJ logic 130 may generate a jitter signal 132 that is a staircase wave with variable step size and period. In some embodiments, responsive to user input, the JINJ logic 130 may generate a jitter signal 132 that is a pseudorandom binary sequence (PRBS) (e.g., PRBS 11) with variable amplitude. In some embodiments, responsive to user input, the JINJ logic 130 may generate a jitter signal 132 that is a digital current (DC) offset (e.g., step function) with a variable amplitude. In some embodiments, another pattern may be implemented. In some embodiments, the JINJ logic 130 may generate a jitter signal 132 based on settings of corresponding registers. The registers may be set by user input (e.g., via software, via a user interface, etc.). The jitter signal 132 may be a digital signal.

The JINJ logic 130 may be an on-die programmable jitter generator circuit that injects a controlled periodic jitter pattern into the CDR control loop (e.g., to apply the jitter signal 132 to the DCO control signal 122) during link operation (e.g., during receiving of an analog signal 170 from a transmitter component). In some embodiments, the CDR logic circuit 110 is able to track lower frequencies according to its loop bandwidth (BW).

Responsive to receiving the jitter signal 132 applied to the DCO control signal 122, the DCO 140 may generate a DCO clock signal 142. The DCO 140 may sum the outputs of the JINJ logic 130 and the controller 120. The DCO 140 may generate a frequency (e.g., DCO clock signal 142) that depends on the sum of the DCO control signal 122 and the jitter signal 132.

Referring to FIG. 1A, the CDR control loop may include the flow of the controller 120 receiving the phase signal 162, the DCO 140 receiving the jitter signal 132 (from JINJ logic 130) applied to the DCO control signal 122 (from controller 120), and the controller 120 receiving the DCO clock signal 142 (from DCO 140) applied to the phase signal 162. The CDR control loop may include more or less components and/or signals than those shown in FIG. 1A (e.g., see FIG. 1B).

Referring to FIG. 1B, receiver component 100B may include a slicer 150 and a phase detector 160. In some embodiments, the slicer 150 and the phase detector 160 are part of the CDR logic circuit 110. In some embodiments, the slicer and the phase detector 160 are not part of a CDR logic circuit 110.

The slicer 150 may receive an analog signal 170 and may generate digital receiver data 152 based on the analog signal 170. The slicer 150 may covert the analog signal 170 into a digital signal (e.g., bits) to generate digital receiver data 152. For example, the slicer 150 may slice the analog signal 170 at a point in time (e.g., based on the DCO clock signal 142) and responsive to the sliced analog signal 170 being positive or negative, the slicer 150 may generate a zero or one.

The phase detector 160 may generate the phase signal 162 based on the digital receiver data 152. The phase detector may detect whether, based on the digital receiver data 152, timing of the clock of the receiver component 100 (e.g., DCO clock signal 142) is early or late (e.g., compared to the analog signal 170 from the transmitter component). Based on the determination of whether the clock of the receiver component 100 is early or late, the phase detector 160 outputs a phase signal 162 to drive the control loop (e.g., CDR logic circuit 110, controller 120 and DCO 140) so that the clock of the receiver component 100 samples at the correct position. The phase signal 162 may indicate the position of the clock of the receiver component 100 compared to the analog signal 170.

The controller 120 may receive the phase signal 162 from the phase detector 160. The controller may generate the DCO control signal 122 based on the phase signal 162 as described herein. The controller 120 may clean the phase signal 162 (e.g., the phase signal 162 may be noisy) to generate a cleaner and more stable signal (e.g., DCO control signal 122) to drive the DCO 140.

Period of the jitter signal 132 (e.g., interference period, $T_{jit}$) may be determined by the logic clock period ($T_{CLK}$). The full rate clock may be $40*T_{CLK}$ and the period of the jitter signal 132 is calculated as shown below:

$$T_{jit}=4*40*T_{CLK}*(1+\text{csr\_jtr\_cnt\_en\_thr})=4*40*1/(25.78125E^9)$$

The amplitude of the jitter signal (e.g., interference amplitude, $A_{jit}$) may be calculated as shown below:

$$A_{jit}=\Delta F_{DCO}*\text{csr\_jtr\_max\_val}$$

The phase peak-to-peak amplitude of the jitter signal 132 ($\Delta\phi_{jit}(p-p)$) in radians may be calculated as shown below:

$$\begin{aligned}\Delta\phi_{jit} &= 2\pi * \int (A_{jit}*T_{jit}) \\ &= 2\pi * (A_{jit}*T_{jit})/4 \\ &= 2\pi * (\Delta F_{DCO}*\text{csr\_jtr\_max\_val}*160*T_{CLK}* \\ &\quad (1+\text{csr\_jtr\_cnt\_en\_thr}))/4 \\ &= 2\pi * \Delta F_{DCO}*\text{csr\_jtr\_max\_val}*40*T_{CLK}* \\ &\quad (1+\text{csr\_jtr\_cnt\_en\_thr})\end{aligned}$$

For example, for $\Delta F_{DCO}=10E6$, $F_{CLK}=25.78125E9$, csr_jtr_max_val=10, and csr_jtr_cnt_en_thr=0, we get:

$$\begin{aligned}\Delta\phi_{jit}(p-p) &= 2\pi * \Delta F_{DCO}*\text{csr\_jtr\_max\_val}*40*T_{CLK} \\ &= 2\pi * 10E6 * 10 * 40 * 1/25.78125E9 \\ &= 0.9747\,[\text{rad}] \\ &= \text{Equivalent to } \sim 6[\text{picoseconds (psec)}] \\ &= \sim 0.1547\,[UIp-p]\end{aligned}$$

The amplitude of the jitter signal 132 (e.g., jitter amplitude injected) may be in units of DCO. To build a time scale, the DCO step size may be calibrated (e.g., via PPM meter 200, see FIG. 2 and FIG. 5A).

As illustrated in FIGS. 1A-B, on-die jitter is injected at the clock of the receiver component 100. In some embodiments, on-die jitter is injected at the clock of the transmitter component to stress the receiver component 100 (e.g., the link partner). In some embodiments, the JINJ logic 130 is located in the transmitter component.

The JINJ logic 130 may implement a periodic jitter (PJ) (e.g., a periodic component PJ). In some embodiments, calibrated random jitter (RJ) may be added (e.g., using a long PRBS generator).

FIG. 2 illustrates a parts per million (PPM) meter 200, according to certain embodiments. The PPM meter 200 may be a circuit of the receiver component 100. In some embodiments, the CDR logic circuit 110 includes the PPM meter 200.

The PPM meter 200 may include a DCO clock counter 210 and a reference clock counter 220. The reference clock counter 220 may receive a clock signal that has a stable frequency and the DCO clock counter 210 may receive the clock signal that is being measured. The PPM meter 200 may count the PPM difference between the two clocks using the counters 210 and 220 running in parallel. Responsive to one of counter 210 or 220 reaching a configurable threshold, the counter that reached the configurable threshold causes the other counter to stop.

The DCO clock counter 210 may receive a DCO clock signal 142 from DCO 140 (see FIGS. 1A-B) and may generate a DCO clock count 214 (Y). The reference clock counter 220 may receive a reference clock signal 222 (e.g., from a transmitter component, generated by the phase-locked loop (PLL) of the transmitter component) and may generate a reference clock count 224 (R). The PPM meter 200 may have a threshold count. The PPM meter 200 may cause one or more of the DCO clock counter 210 or the reference clock counter 220 to start counting. Once one of the counters 210 or 220 starts or is about to start counting, the counter may trigger the other counter to start counting (e.g., at the same time or substantially the same time as the original counter). Once one of the counters 210 or 220 reaches the threshold count, the counter may trigger the other counter to stop counting. The PPM meter 200 may receive the DCO clock count 214 and reference clock count 224 and may calculate a DCO frequency. The PPM meter 200 may calculate the DCO frequency using the following equation:

$$DCO\ frequency = Ref\_frequency * (1 + (Y - R)/R)$$

The Ref_frequency may be the frequency of the reference clock signal 222. "Y" may be the DCO clock count 214 generated by the DCO clock counter 210. "R" may be the reference clock count 224 generated by the reference clock counter 220.

The outputs of the PPM meter 200 (e.g., DCO clock count 214, reference clock count 224, DCO frequency) may be outputted to a register of the receiver component 100 and may be read (e.g., by software, by a graphical user interface, tec.)

Figure 5A:
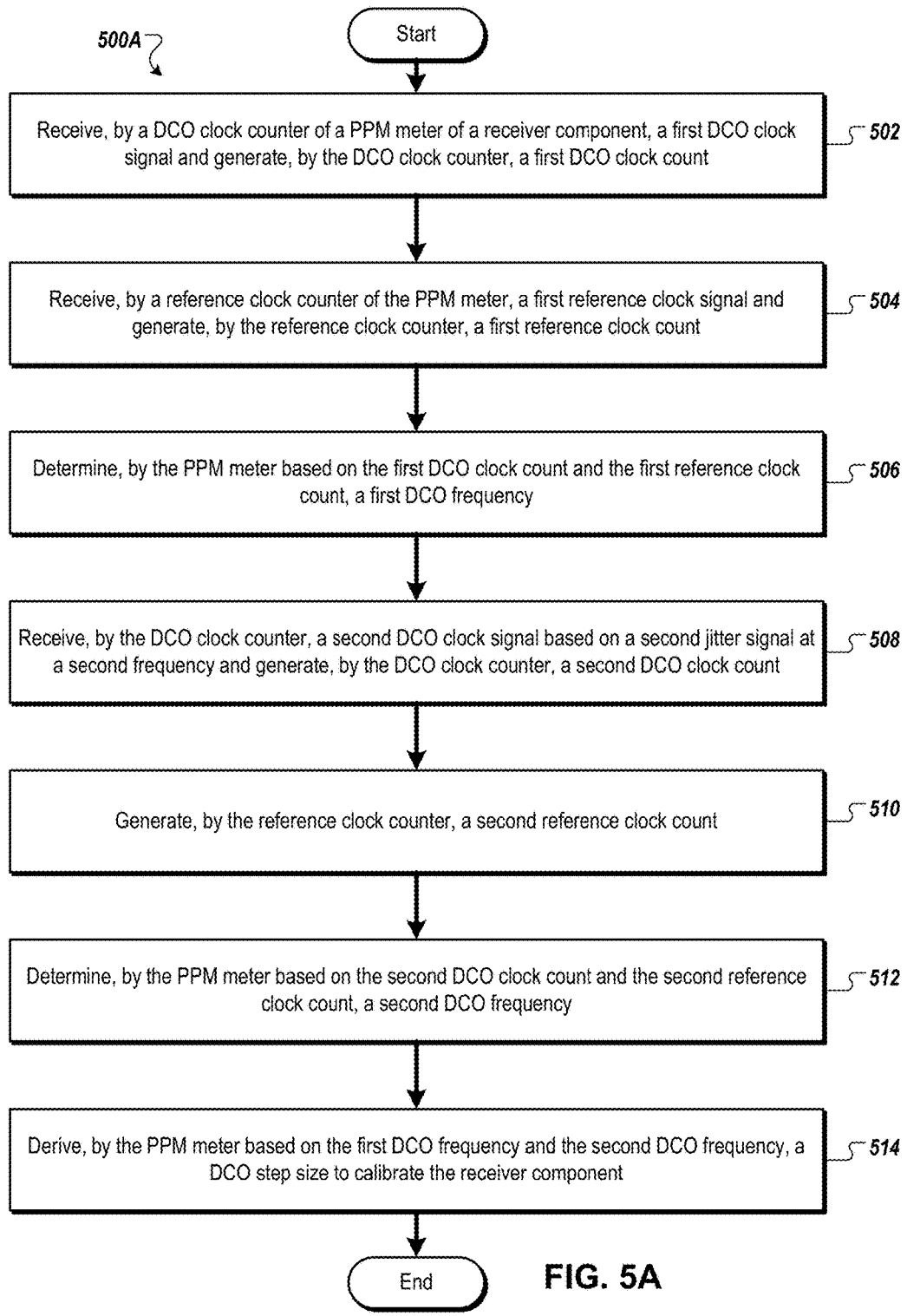
FIGS. 5A-C are flow diagrams of methods for on-chip jitter tolerance testing, according to certain embodiments.

The clock signal from the transmitter component (e.g., unjittered) may be used as the reference clock signal 222. The clock signal of the receiver component (e.g., jittered, DCO clock signal 142) may be used for comparison. The DCO clock signal 142 may be forced to a first DCO setting (e.g., using a first jitter signal at a first frequency and a first amplitude) and the frequency may be measured. The DCO clock signal 142 may be forced to a second DCO setting (e.g., using a second jitter signal at a second frequency and a second amplitude) and the frequency may be measured. The difference between the two frequencies may be used to derive the DCO step size. Using the DCO step size estimation, the level of jitter injected to the CDR loop for a given pattern may be calculated. The PPM meter 200 may be used to calibrate the jitter tolerance testing as shown in FIG. 5A.

In some embodiments, the DCO frequency may be used to calibrate how many steps translate to a percentage of UI and then the JINJ logic 130 may inject a jitter signal 132 with that amount of steps. In some embodiments, jitter signals 132 with increasing amounts of steps are injected by the JINJ logic 130 and the receiver component 100 determines at what point the receiver component 100 has errors to determine how many steps the receiver component can tolerate (e.g., maximum amount of steps). The receiver component 100 may calibrate the maximum amount of steps and convert the maximum amount of steps to UI.

Figure 3:
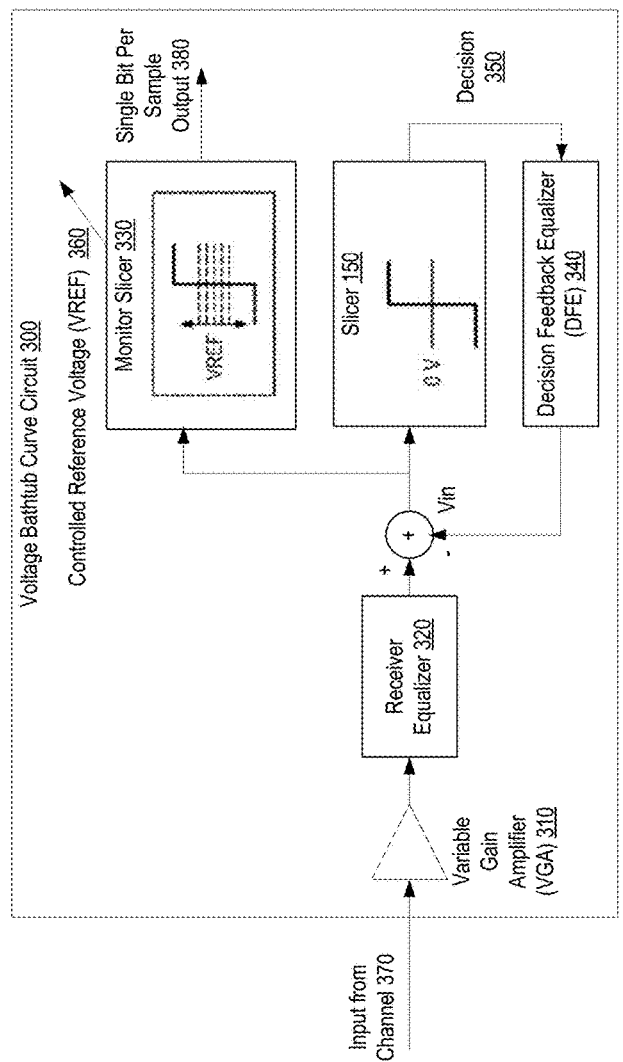
FIG. 3 illustrates a voltage bathtub curve circuit, according to certain embodiments.

FIG. 3 illustrates a voltage bathtub curve circuit 300, according to certain embodiments. The receiver component 100 may include the voltage bathtub curve circuit 300. In some embodiments, the CDR logic circuit 110 may include the voltage bathtub curve circuit 300. The voltage bathtub curve circuit 300 may include a monitor slicer 330 (e.g., a 1-bit monitor slicer with adjustable reference voltage to acquire a voltage bathtub curve). The voltage bathtub curve circuit 300 may include slicer 150 (e.g., a data slicer). Slicer 150 in FIG. 3 may be the same as slicer 150 in FIG. 1B. The voltage bathtub curve circuit 300 may include a variable gain amplifier (VGA) 310, a receiver equalizer 320, and a decision feedback equalizer (DFE) 340.

The JINJ logic 130 may be used with the voltage bathtub curve circuit 300 to measure and plot a jitter tolerance eye (JTE) of the receiver component 100. The JINJ logic 130 may generate jitter signals 132, where each jitter signal 132 has a different amplitude. In some embodiments, the voltage bathtub curve circuit 300 may receive the DCO clock signal 142 (e.g., input from channel). In some embodiments, the voltage bathtub curve circuit 300 receives jitter signals 132 from the JINJ logic 130. Several bathtub curves with different jitter amplitudes may be acquired and used to build a jitter tolerance eye (JTE) as illustrated in FIGS. 4E and 5C.

Slicer 150 may be a receiver decision device (e.g., a device utilized to determine the value of a bit at the receiver component 100). Slicer 150 may be sensitive to noise, signal degradation, and other transients appearing in data (e.g., analog signal 170) received at receiver component 100. If the probability of the event of "the absolute received signal level at the sampling instant being below voltage margin VM" is P, then the voltage margin at the probability P is VM. If slicer 150 requires a minimum voltage level VM to determine a binary value correctly, then fulfilling a BER (bit error rate) condition for the receiver component 100 may be achieved through voltage margin (at a particular BER probability) greater than VM.

Monitor slicer 330 may be provided in connection with BER estimation functionality and may be the decision device for the voltage bathtub curve circuit 300. In some embodiments, the receiver component 100 is a high-speed receiver and the monitor slicer 330 is located at the end of a receiver chain of the receiver component 100. Monitor slicer 330 may include a configurable reference voltage level (VREF) 360. The decision level voltage (e.g., monitor level) of the monitor slicer 330 may be adjustable for the monitor slicer 330 to detect "1"s at a variety of voltage levels. A range of signal samples may be provided and the output of the monitor slicer 330 may serve as a reference for the signal samples. The monitor slicer 330 may sample a signal concurrently with slicer 150 and both can provide a single bit output per sample. For example, if the sampled voltage is above VREF 360 (e.g., the variable VREF level of the monitor slicer 330), the monitor slicer 330 may output "1" and if the sampled voltage is lower than VREF 360, monitor slicer 330 may output "0." Similarly, the slicer 150 may decide values present on the signal using the minimum voltage margin characteristics of the receiver component 100. In some embodiments, BER is analyzed in the voltage domain. In some embodiments, BER is analyzed in the timing domain (e.g., if timing is modified).

Responsive to receiving an input signal, the monitor slicer 330 and slicer 150, at a particular instance, may decide whether to output a "1" or a "0." The monitor level may be scanned or adjusted over voltage ranges and for each level, the respective outputs of the monitor slicer 330 and the slicer 150 can be compared. If the monitor level is adjusted to a positive value, an event where the slicer 150 outputs "1" and the monitor slicer 330 outputs "0" may be determined to be a "soft error." Similarly, if the monitor level is a negative value, an event where the slicer 150 outputs a "0" and the monitor slicer 330 outputs a "1" may also be defined as a "soft error." By counting the number of soft errors detected at a particular monitor level V, the probability P(V) can be measured. In some instances, P(V) may resemble a cumulative distribution for a Gaussian random variable, or the complementary error function erfc(V) or Q-function Q(V).

If VREF 360 is set to 0 (corresponding to slicer 150), and assuming the input signal enables correct decisions 350 of slicer 150 (e.g., no hard errors), the soft error rate (SER) should be zero. A soft error may be defined as a sampled input level Vin (at the sampling instant) which is between the respective reference levels of slicer 150 and monitor slicer 330, or within [0, VREF]. Such input may result in different outputs of monitor slicer 330 and slicer 150. If VREF 360 is set to Vi (median of the absolute signal level), then the probability of Vin<VREF may be one-half (e.g., the median), so the SER may also be one-half. For any other VREF setting, the SER represents the probability of the signal being in the region between the two reference levels of the monitor slicer 330 and slicer 150.

In one embodiment, the SER may be estimated by counting soft error events over a large enough number of candidate bits, and normalizing by the number of candidate bits (e.g., under appropriate assumptions such as stationarity, ergodicity, and symmetry of the random processes that create noise). The resolution of this estimation may depend on the period. For example, if the SER is around one times ten raised to the power of negative nine (1e−9), the measurement may span a period of more than ten raised to the power of nine (1e9) candidate bits (e.g., in order to get statistically acceptable confidence level). However, if the SER is around one times ten raised to the power of negative 3 (1e−3), a few thousand candidate bits may be sufficient data to generate the result with the desired resolution (e.g., the order of magnitude may be sufficient).

If the measurement is performed with a symmetrical bit sequence (e.g., a perfectly symmetrical bit sequence), the SER may be independent of the polarity of VREF 360. In practice, the bit sequence may be biased over the measured period and the result may also be biased. For example, if VREF 360 is positive, then negative inputs cannot generate soft errors (even if very close to zero). To remove the dependency on bit sequence, the candidate bits may include only "1" bits if VREF 360 is positive and only "0" bits if VREF 360 is negative.

The voltage bathtub curve circuit 300 may receive input from channel 370 (e.g., analog signal 170, DCO clock signal 142). The voltage bathtub curve circuit 300 may output a single bit per sample output 380. In some embodiments, VGA 310 receives the input from channel 370, the receiver equalizer 320 receives output from the VGA 310, the monitor slicer 330 and slicer 150 receive output from the receiver equalizer 320, and the slicer 150 outputs a decision 350 to the DFE 340. The slicer 150 and the monitor slicer 330 may receive the output from the DFE 340 applied to the output from the receiver equalizer (e.g., one output superimposed on the other output). The monitor slicer 330 may have a VREF 360 and may output a single bit per sample output 380. The single bit per sample output 380 may be used to estimate a soft error rate (SER). A cumulative probability function (e.g., bathtub curve) may be based on estimating SER (e.g., single bit per sample output 380) and may be generated or calculated based on a series of monitoring sessions at a range of reference voltages (e.g., VREF 360), each session generating a respective SER. Several bathtub curves may be acquired by applying different jitter amplitudes, using the JINJ logic 130 (e.g., as in receiver components 100A-B). The bathtub curves may be used to build a jitter tolerance eye (JTE) as shown in FIG. 4E.

Figure 4A:
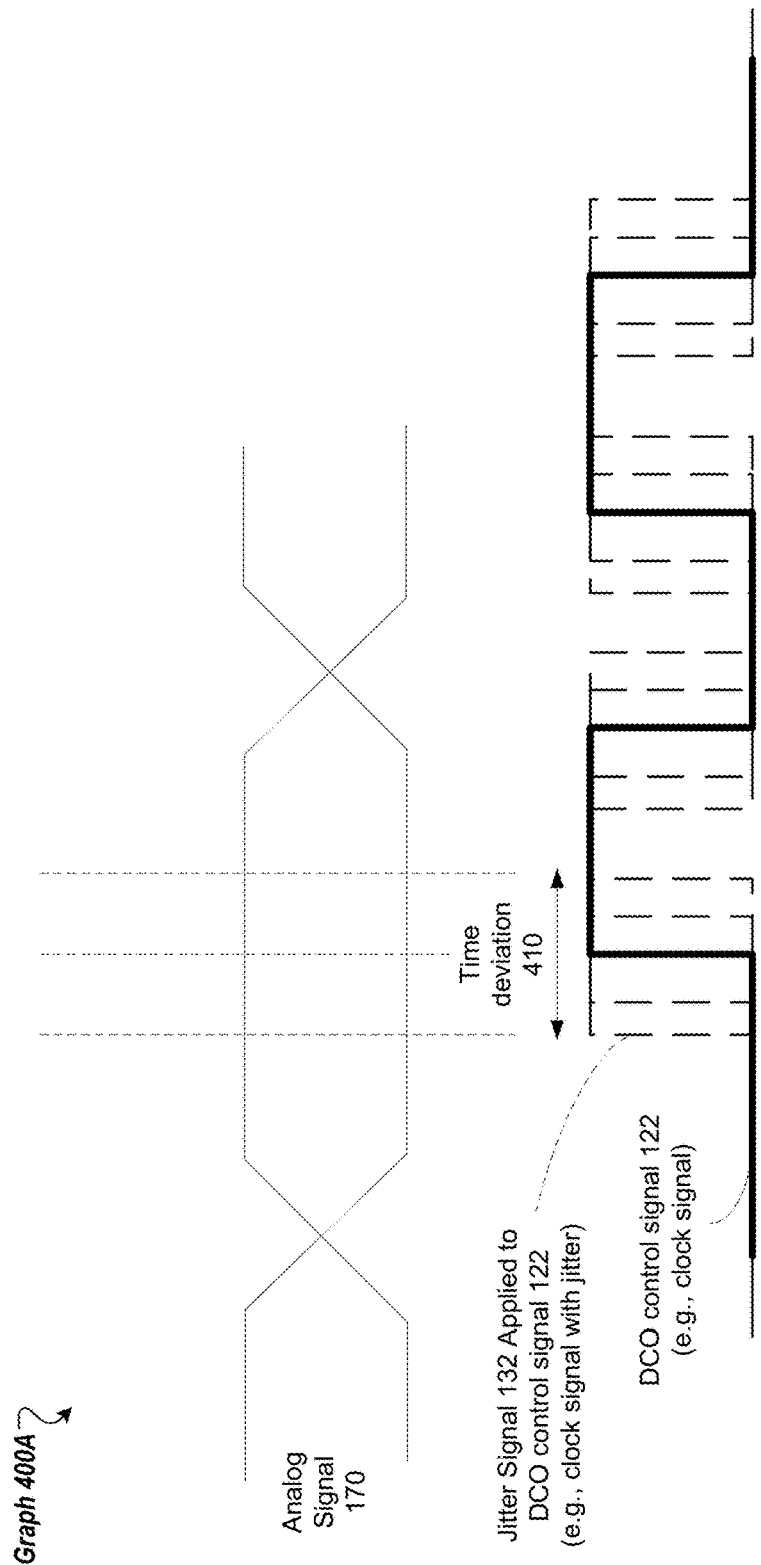
FIG. 4A is a graph illustrating a jitter signal applied to a digitally controlled oscillator (DCO) control signal, according to certain embodiments.

FIG. 4A is a graph 400A illustrating a jitter signal 132 applied to the DCO control signal 122, according to certain embodiments. Graph 400A displays analog signal 170, the DCO control signal 122 (e.g., clock signal), and jitter signal 132 applied to DCO control signal 122 (e.g., clock signal with jitter). The analog signal 170 may be received by the receiver component 100 from a transmitter component. The analog signal 170 may be a periodic signal based on the clock of the transmitter component. The receiver component 100 may use the clock (e.g., DCO clock signal 142) of the receiver component 100 to read the analog signal 170. In some embodiments, the clock of the receiver component 100 is based on the DCO control signal 122. In some embodiments, the clock (e.g., DCO clock signal 142) of the receiver component 100 is based on jitter signal 132 applied to the DCO control signal 122. The jitter signal 132 applied to the DCO control signal 122 has a time deviation of 410 from the DCO control signal 122. The jitter signal 132 applied to the DCO control signal 122 may be used to test the jitter tolerance of the receiver component 100. For example, the jitter tolerance test may be used to determine at which jitter signals 132 (e.g., which patterns, which amplitudes, which frequencies) the receiver component 100 can accurately read analog signal 170.

FIG. 4B is a graph 400B illustrating a jitter signal 132, according to certain embodiments. The jitter signal 132 may have a jitter count 420 (jtr_cnt[8:0]), a jitter maximum value 422 (csr_jtr_max_val_c[7:0]), a jitter step size 424 (csr_jtr_step_size_c[7:0]), and a time between steps 426 (csr_jtr_cnt_en_thr_c[8:0]). The jitter signal 132 may have a jitter step size 424 compared to the clock signal 428 (e.g., DCO control signal 122, transmitter clock, etc.).

The JINJ logic 130 may generate the jitter signal 132 and the DCO 140 may receive the jitter signal 132 applied to the DCO control signal 122. Responsive to user input, the JINJ logic 130 may set one or more of the pattern of the jitter signal 132, the jitter count 420, jitter maximum value 422, jitter step size 424, or the time between steps 426 of the jitter signal 132.

FIG. 4C is a graph 400C of a jitter signal 132, according to certain embodiments. The jitter signal 132 may have a jitter period 430 ($T_{jit}$), a phase peak-to-peak jitter amplitude 432 ($\Delta\phi_{jit}$(p-p)), and a jitter amplitude 434 ($A_{jit}$). Graph 400C may illustrate the phase jitter and the jitter wave (JINJ logic 130 wave) of jitter signal 132. Responsive to user input, the JINJ logic 130 may set one or more of the jitter period 430, phase peak-to-peak jitter amplitude 432, jitter amplitude 434, pattern of the jitter signal 132 (e.g., phase jitter, jitter wave), etc.

Figure 4D:
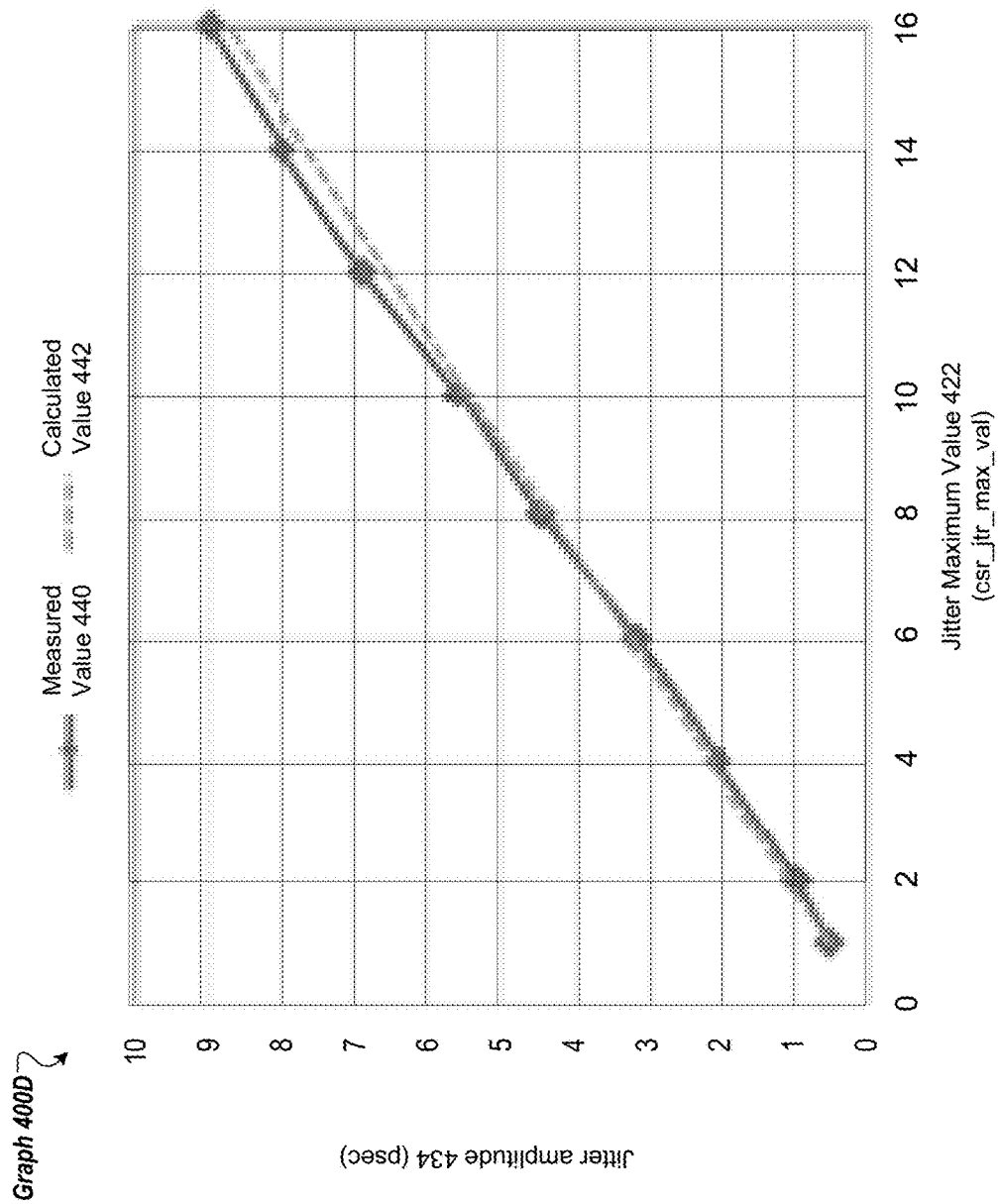
FIG. 4D is a graph illustrating measured values and calculated values for jitter signals, according to certain embodiments.
Figure 4E:
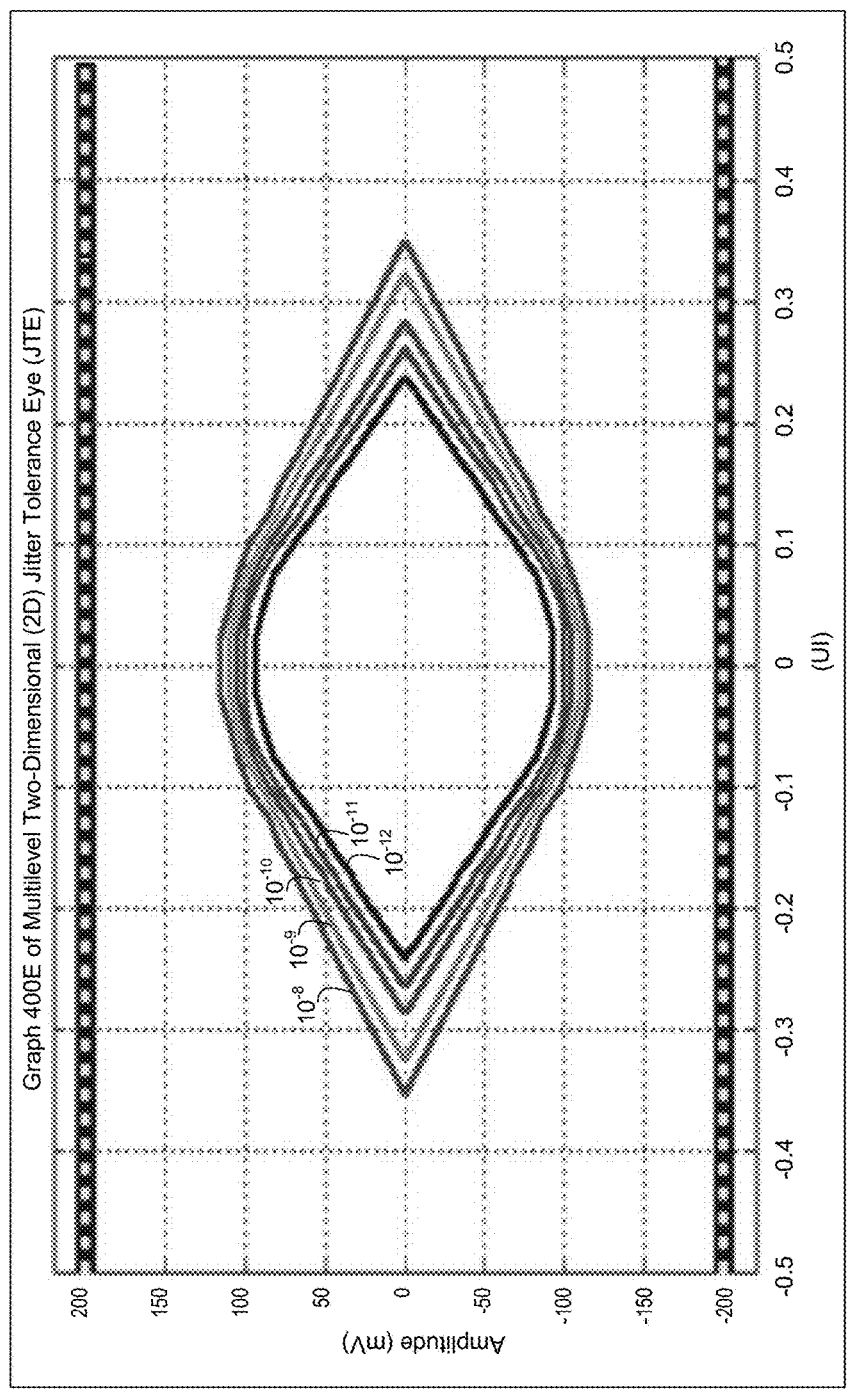
FIG. 4E is a graph illustrating a two-dimensional (2D) jitter tolerance eye (JTE), according to certain embodiments.

FIG. 4D is a graph 400D illustrating measured values and calculated values for jitter signals 132, according to certain embodiments. Graph 400D displays jitter amplitude 434 (picoseconds (psec)) plotted against jitter maximum value 422 (csr_jtr_max_val). Graph 400D displays a solid line for the measured value 440 and a dashed line for the calculated value 442. The level of jitter injected to the CDR loop for a given pattern may be calculated using the DCO step size estimation to generate the calculated value 442. An actual jitter measurement (e.g., using a scope, using external equipment, etc.) performed on an actual device is shown by measured value 440. In some embodiments, the measured value 440 is from a test performed externally (e.g., using an external device to provide a jitter signal) and the calculated value 442 is from a test performed internally (e.g., using JINJ logic 130).

FIG. 4E is a graph 400E illustrating a two-dimensional (2D) jitter tolerance eye (JTE), according to certain embodiments.

Examining the "eye width" (e.g., vertical margin) at extreme bit error rate (BER) of $10^{-12}$ provides insight on how much jitter (e.g., frequency of jitter signal 132, amplitude of jitter signal 132) can be tolerated by the receiver component 100 while meeting the BER. The 2D JTE is a graphical representation of the jitter tolerance test and may be more meaningful than "eye scanning" methods that use dedicated slicers without affecting the CDR clock (e.g., DCO clock signal 142 of the CDR logic circuit 110). The results shown in the 2D JTE may be obtained consistently. Using the JTE, the amount of jitter which can be injected before the eye is closed down to BER=$10^{-12}$ may be derived (e.g., Max_tol_jitter_ptp). To validate the result, the jitter may be injected through a calibrated pattern generator. Responsive to the resulting vertical eye being observed to "close" down to $10^{-12}$, the jitter may be measured and compared to Max_tol_jitter_ptp. Accuracy of the prediction to jitter tolerance may be +/−2% verses actual jitter tolerance levels. The methods described herein may be used to predict external jitter tolerance of a receiver component 100. Acquisition time of the JTE using an on-chip jitter tolerance test may take less than one tenth the time required for BER testing using external testing equipment (e.g., an external BERT).

The JINJ logic 130 may be implemented on a DCO-based CDR design (e.g., a CDR logic circuit 110 that includes a DCO 140). In some embodiments, the methods described herein (e.g., an on-chip jitter tolerance test) may be applied to a PI-based CDR (e.g., a CDR logic circuit 110 that includes a phase interpolator (PI)). In a PI-based CDR, digital jitter addition may be performed. In a PI-based CDR, the uncertainty of the jitter amplitude may be assumed to be small (e.g., without calibrating jitter amplitude calibration).

Jitter injection may be applied in the transmitter's digital phase-locked loop (PLL) control. Applying jitter to the transmitter's digital PLL control would create jitter on the transmitted signal (e.g., analog signal 170) which would stress the CDR logic circuit 110 of the receiver component 100 (e.g., the link partner's CDR).

Figure 5B:
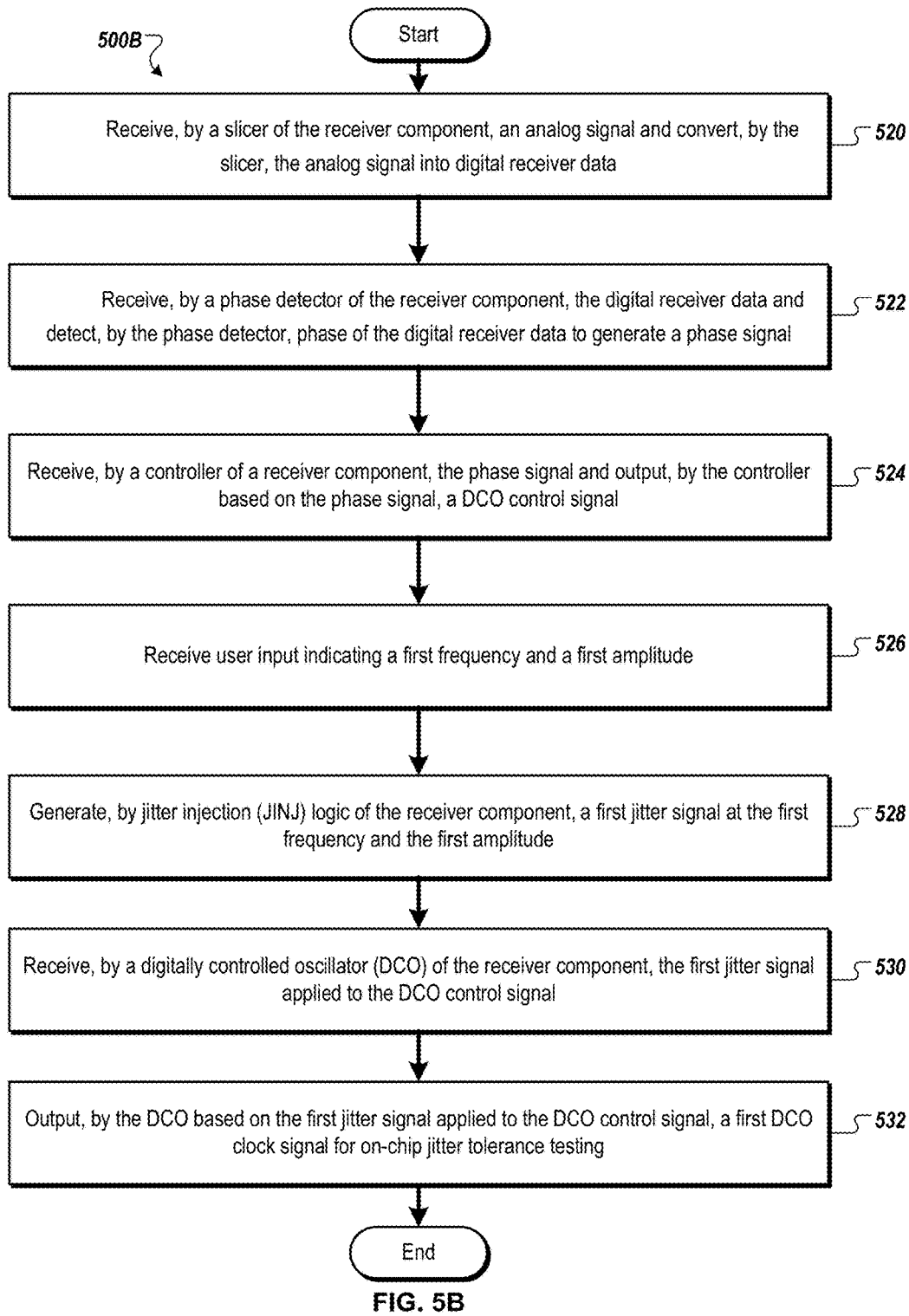
Figure 5C:
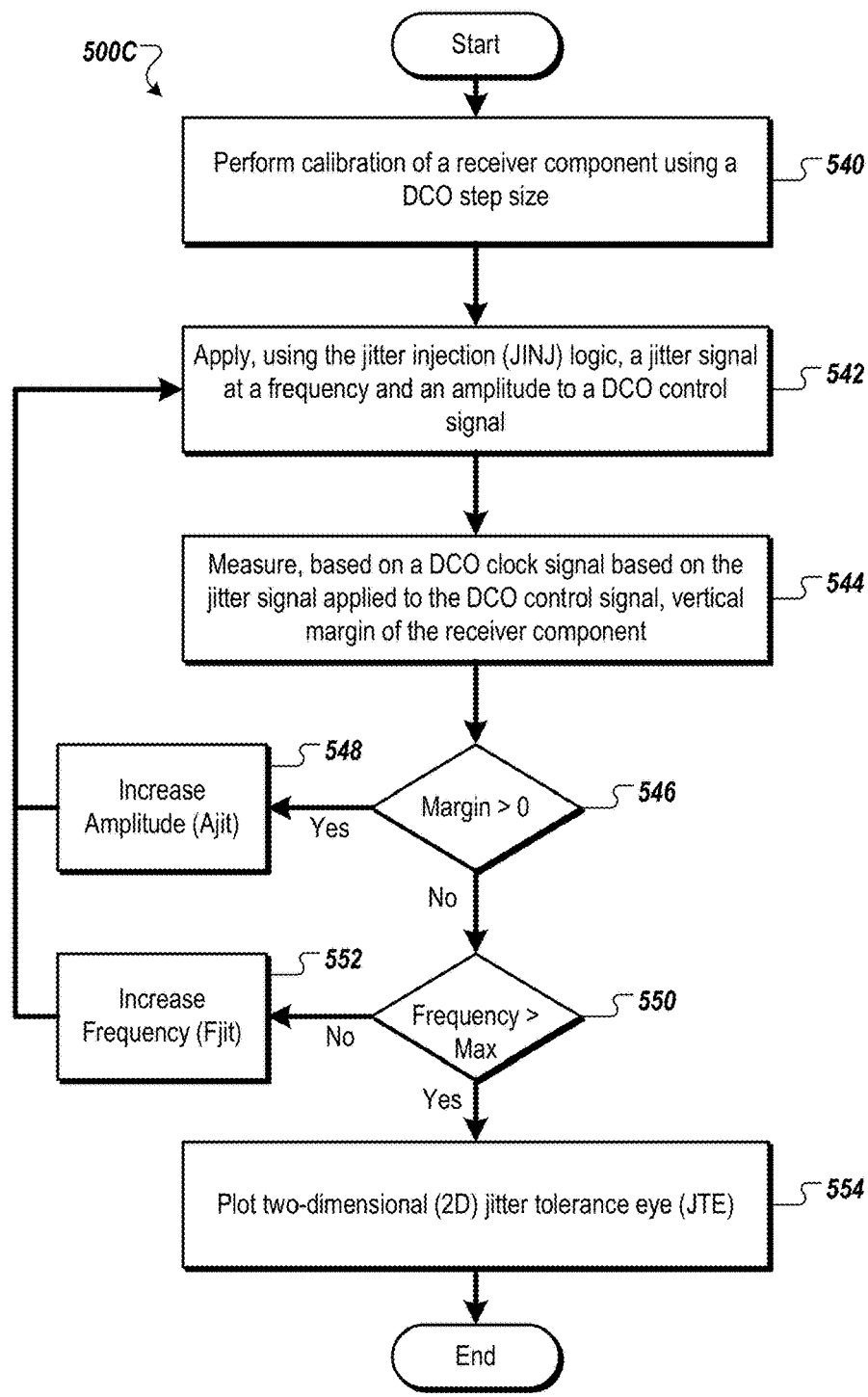

FIGS. 5A-C are flow diagrams of methods 500A-C of on-chip jitter tolerance testing, according to one embodiment. Methods 500A-C may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, methods 500A-C may be performed, in part, by a receiver component 100. In some embodiments, a non-transitory storage medium stores instructions that when executed by a processing device of the receiver component 100 cause the processing device to perform methods 500A-C.

For simplicity of explanation, methods 500A-C are depicted and described as a series of acts. However, acts in accordance with this disclosure can occur in various orders and/or concurrently and with other acts not presented and described herein. Furthermore, not all illustrated acts may be performed to implement the methods 500A-C in accordance with the disclosed subject matter. In addition, those skilled in the art will understand and appreciate that the methods 500A-C could alternatively be represented as a series of interrelated states via a state diagram or events.

FIG. 5A is a flow diagram of a method 500A of calibrating for on-chip jitter tolerance testing, according to one embodiment.

Referring to FIG. 5A, at block 502, the receiver component 100 receives, by a DCO clock counter 210 of a PPM meter 200 of the receiver component 100, a first DCO clock signal 142A and generates, by the DCO clock counter 210, a first DCO clock count 214A. Block 502 may be responsive to opening the CDR loop (e.g., receiving an analog signal 170 from a transmitter component).

At block 504, the receiver component 100 receives, by a reference clock counter 220 of the PPM meter 200, a reference clock signal 222 and generates, by the reference clock counter 220, a first reference clock count 224A.

At block 506, the receiver component 100 determines, by the PPM meter 200 based on the first DCO clock count 214A and the first reference clock count 224A, a first DCO frequency. The first DCO frequency may be calculated using the following equation:

DCO Frequency=Ref_frequency*(1+(first DCO clock count 214A)−(first reference clock count 224A))/(first reference clock count 224A))

At block 508, the receiver component 100 receives, by the DCO clock counter 210, a second DCO clock signal 142B based on a second jitter signal 132B at a second frequency and generates, by the DCO clock counter 210, a second DCO clock count 214B. The second jitter signal 132B may include injecting N steps of jitter by the JINJ logic 130.

At block 510, the receiver component 100 generates, by the reference clock counter 220, a second reference clock count 224B.

At block 512, the receiver component 100 determines, by the PPM meter 200 based on the second DCO clock count 214B and the second reference clock count 224B, a second DCO frequency.

At block 514, the receiver component 100 derives, by the PPM meter based on the first DCO frequency and the second DCO frequency, a DCO step size to calibrate the receiver component 100. For example, if the first DCO frequency is A, N steps of jitter are injected, and the second DCO frequency is B, the DCO step size may be calculated using the following equation:

$$\text{DCO step size} = (B-A)/N$$

The DCO step size may be used to calculate the level of jitter (e.g., the calculated value 442 of FIG. 4D) injected to the CDR loop for a given pattern. The calibration of the receiver component 100 (e.g., using the DCO step size) may be used to correlate the internal test (e.g., using JINJ logic 130) and an external test (e.g., using external equipment) for JTT. The DCO step size (e.g., $\Delta F_{DCO}$) may be used translate digital amplitude that the JINJ logic 130 is injecting into the CDR loop into a jitter amplitude (e.g., jitter amplitude 434).

In some embodiments, the DCO step size is correlated to percentage of UI (unit interval). UI may be the minimum time interval between condition changes of a data transmission signal (e.g., pulse time, symbol duration time). The UI may be the time taken in the data stream by each subsequent pulse. UI may be a unit of measurement of time and may represent a predetermined time interval. Jitter may be measured as a fraction of UI. For example, jitter of 0.01 UI may be jitter that moves a signal edge by 1% of the UI duration. Use of UI in jitter measurements may be used to apply the same requirements or results to cases of different symbol rates (e.g., when phenomena investigated are not independent from symbol duration time but closely related to it). For example UI may be used to measure timing jitter in serial communications or in on-chip clock distributions.

Different jitter signals 132 (e.g., different amplitudes, different frequencies, different patterns, etc.) of different DCO step sizes may be injected by the JINJ logic 130 into the CDR loop until errors are detected (e.g., the receiver component 100 is unable to read the analog signal 170 using the DCO clock signal 142). The amount of DCO steps where errors are detected may be referred to a maximum amount of DCO steps and may be converted to UI.

FIG. 5B is a flow diagram of a method 500B of on-chip jitter tolerance testing, according to one embodiment.

Referring to FIG. 5B, at block 520, the receiver component 100 receives, by a slicer 150 of the receiver component 100, an analog signal 170 (e.g., from a transmitter component, from the receiver component 100) and converts, by the slicer 150, the analog signal 170 into digital receiver data 152.

At block 522, the receiver component 100 receives, by a phase detector 160 of the receiver component 100, the digital receiver data 152 and detects, by the phase detector 160, phase of the digital receiver data 152 to generate a phase signal 162.

At block 524, the receiver component 100 receives, by a controller 120 (e.g., of CDR logic circuit 110) of the receiver component 100, the phase signal 162 and outputs, by the controller 120 based on the phase signal 162, a DCO control signal 122.

At block 526, the receiver component 100 receives user input indicating a first frequency and a first amplitude. In some embodiments the user input further indicates a first pattern.

At block 528, the receiver component 100 generates, by JINJ logic 130 of the receiver component 100, a first jitter signal 132A at the first frequency and the first amplitude. In some embodiments, the first jitter signal 132A is of the first pattern.

At block 530, the receiver component 100 receives, by a DCO 140 of the receiver component 100, the first jitter signal 132A applied to the DCO control signal 122.

At block 532, the receiver component 100 outputs, by the DCO 140 based on the first jitter signal 132A applied to the DCO control signal 122, a first DCO clock signal 142 for on-chip jitter tolerance testing. In some embodiments, the receiver component 100 determines the level of jitter signal 132 (e.g., amplitude, frequency, pattern, etc.) that may be injected before an error occurs (e.g., before the receiver component 100 cannot read analog signal 170). In some embodiments, the receiver component 100 determines that the receiver component 100 meets the specification at a set of different levels of jitter signals 132 (e.g., analog signal 170 is readable at the set of different levels of jitter signals 132).

FIG. 5C is a flow diagram of a method 500C of plotting a 2D JTE for on-chip jitter tolerance testing, according to one embodiment.

Referring to FIG. 5C, at block 540, receiver component 100 performs calibration of the receiver component 100 using a DCO step size (see FIG. 5A).

At block 542, receiver component 100 applies the first jitter signal 132A at a first frequency and a first amplitude to the DCO control signal 122.

At block 544, receiver component 100 measures, based on the DCO clock signal 142, vertical margin of the receiver component 100. The vertical margin may be measured using the single bit per sample output 380 of the voltage bathtub curve circuit 300 (see FIG. 3).

At block 546, receiver component 100 determines whether the vertical margin is greater than zero. If the vertical margin is greater than zero, then flow continues to block 548. If the vertical margin is not greater than zero, then flow continues to block 550.

At block 548, receiver component 100 generates, by the JINJ logic 130, a second jitter signal 132B with a second amplitude that is greater than the first amplitude and flow returns to block 542.

At block 550, receiver component 100 determines whether the first frequency is greater than a maximum frequency. The maximum frequency may be determined by increasing the frequency of the jitter signal 132 until the receiver component 130 has an error (e.g., receiver component cannot read the analog signal 170), where the frequency of the jitter signal 132 prior to frequency that corresponds to the error is the maximum frequency. If the frequency is not greater than a maximum frequency, flow continues to block 552. If the frequency is greater than a maximum frequency, flow continues to block 554.

At block 552, receiver component 100 generates, by the JINJ logic 130, a third jitter signal 132C with a second frequency that is greater than the first frequency and flow continues to block 542.

At block 554, receiver component 100 plots a 2D JTE for on-chip jitter tolerance testing (see FIG. 4E). The 2D JTE may be plotted using the DCO frequency to DCO clock signal 142 calibration from the PPM meter 200 and the amplitude of the jitter signal 132 injected in the CDR loop.

Figure 6:
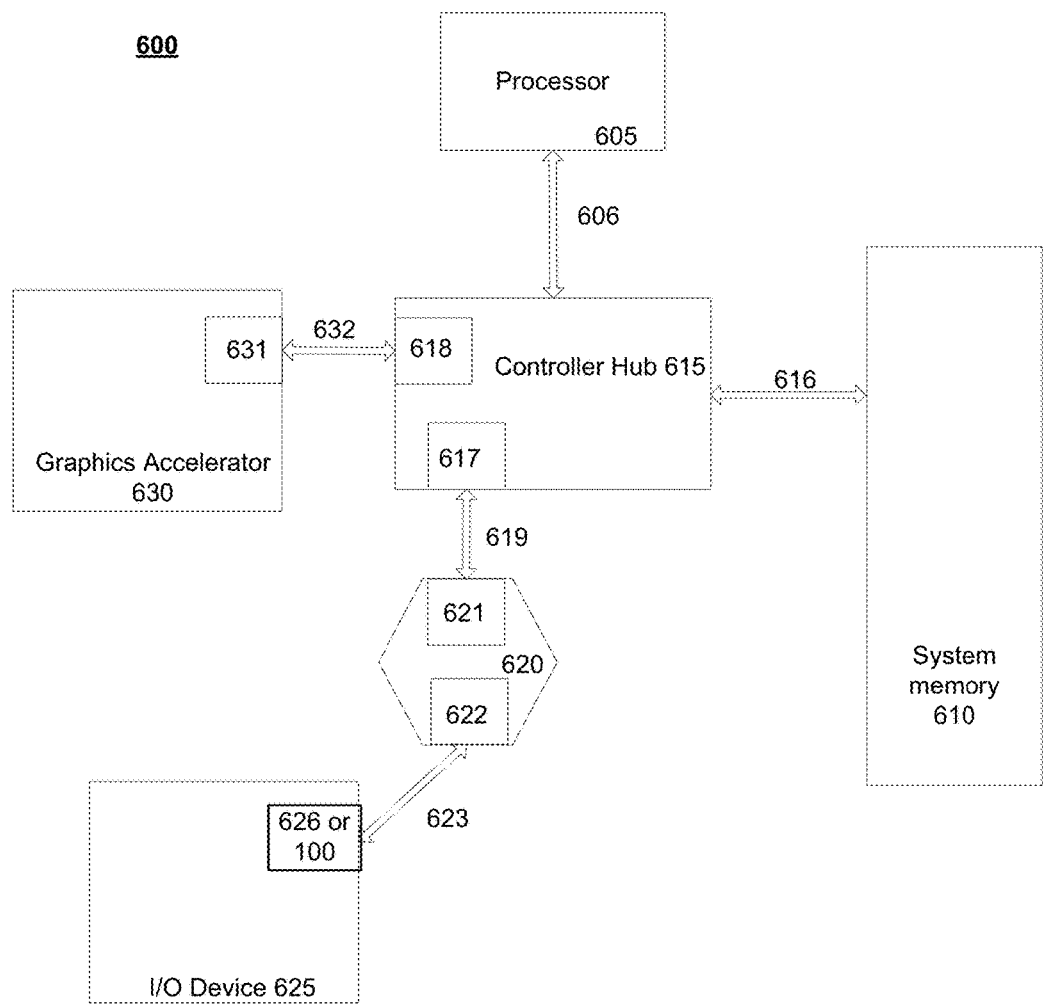
FIG. 6 illustrates a computer system with multiple interconnects, according to one embodiment.

FIG. 6 illustrates a computer system 600 with multiple interconnects, according to one embodiment. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect as described below. In another embodiment, FSB 606 (e.g., link) includes a serial, differential interconnect architecture that is compliant with different interconnect standards.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In some embodiments, one or more of 605, 610, 615, 620, 625, or 630 includes a receiver component 100 (e.g., one or more of 617, 618, 621, 622, 626, 631, etc.). In some embodiments, one or more of 605, 610, 615, 620, 625, or 630 includes a transmitter component (e.g., one or more of 617, 618, 621, 622, 626, 631, etc.). One or more of 605, 610, 615, 620, 625, or 630 may include a JINJ logic for on-chip jitter tolerance testing. One or more of 605, 610, 615, 620, 625, or 630 may include a PPM meter 200 for on-chip jitter tolerance calibration (see FIGS. 2 and 5A). One or more of 605, 610, 615, 620, 625, or 630 may include a voltage bathtub curve circuit 300 to generate a JTE (see FIGS. 3, 4E, and 5C).

In one embodiment, controller hub 615 is a root hub, root complex, or root controller. Examples of controller hub 615 include a chipset, a memory controller hub (MCH), a north bridge, an interconnect controller hub (ICH) a south bridge, and a root controller/hub. Often the term chipset refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex (e.g., controller 615).

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e. up a hierarchy towards a root complex, to controller hub 615 and downstream, i.e. down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Fire wire device, a Universal Serial Bus (USB) device, a scanner, and other input/output devices. Often in the PCIe® vernacular, such as device, is referred to as an endpoint. Although not specifically shown, device 625 may include a PCIe® to PCI/PCI-X bridge to support legacy or other version PCI devices. Endpoint devices in PCIe® are often classified as legacy, PCIe®, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. Similar to the MCH discussion above, a graphics controller or the graphics accelerator 630 itself may be integrated in processor 605.

I/O device 625 includes an interface 626 and switch/bridge 620 includes an interface 622. Interface 626 is coupled to interface 622 via serial link 623.

In one embodiment, short range wireless engines including a WLAN unit and a Bluetooth® unit may couple to processor 605 via an interconnect according to a PCIe® protocol, e.g., in accordance with the PCI Express® Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard. Using WLAN unit, Wi-Fi® communications in accordance with a given Institute of Electrical and Electronics Engineers (IEEE) 802.11 standard can be realized, while via a unit using the Bluetooth® technology, short range communications via a Bluetooth® protocol can occur. In another embodiment, these units may communicate with processor 605 via, e.g., a USB link or a universal asynchronous receiver transmitter (UART) link.

Turning next to FIG. 7, an embodiment of a system on-chip (SOC) design in accordance with the disclosures is depicted. As a specific illustrative example, SOC 700 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 700 includes 2 cores-706 and 707. Similar to the discussion above, cores 706 and 707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 704 to communicate with other parts of system 700. Interconnect 710 includes an on-chip interconnect, such as an IOSF, AMBA, or other interconnect discussed above, which potentially implements one or more aspects of the described disclosure.

Interconnect 710 (e.g., interface) provides communication channels to the other components, such as a Subscriber Identity Module (SIM) 730 to interface with a SIM card, a boot rom 735 to hold boot code for execution by cores 706 and 707 to initialize and boot SOC 700, a SDRAM controller 740 to interface with external memory (e.g. DRAM 760), a flash controller 745 to interface with non-volatile memory (e.g. Flash 765), a peripheral control 750 (e.g. Serial Peripheral Interface) to interface with peripherals, video codecs 720 and Video interface 725 to display and receive input (e.g. touch enabled input), GPU 715 to perform graphics related computations, etc. Any of these interfaces may incorporate aspects of the disclosure described herein.

In some embodiments, interconnect 710 may by coupled with a receiver component 100 for on-chip jitter tolerance testing. In some embodiments, at least a portion of SOC 700 is the receiver component. The at least a portion of the SOC 700 may be coupled to another portion of the SOC 700 for on-chip jitter tolerance testing. The at least a portion of the SOC 700 may be coupled to a transmitter component via interconnect 710 for on-chip jitter tolerance testing.

In addition, the system illustrates peripherals for communication, such as a Bluetooth® module 770, 3G modem 775, GPS 785, and Wi-Fi® 785. Note as stated above, a UE includes a radio for communication. As a result, these peripheral communication modules are not all required. However, in a UE some form a radio for external communication is to be included.

The following examples pertain to further embodiments.

Example 1 is a receiver component comprising: clock data recovery (CDR) logic circuit comprising: a controller to receive a phase signal and to output a DCO control signal; jitter injection (JINJ) logic to generate a first jitter signal at a first frequency and a first amplitude; and digitally controlled oscillator (DCO) to receive the first jitter signal applied to the DCO control signal and to output, based on the first jitter signal applied to the DCO control signal, a first DCO clock signal for on-chip jitter tolerance testing.

In Example 2, the subject matter of Example 1, wherein the controller is a proportional integral (PI) controller.

In Example 3, the subject matter of any one of Examples 1-2, wherein the controller is a loop filter.

In Example 4, the subject matter of any one of Examples 1-3, wherein the JINJ logic is an on-die programmable jitter generator circuit, wherein the JINJ logic is to generate the first jitter signal responsive to receiving user input indicating the first frequency and the first amplitude, wherein the first jitter signal is a periodical pattern with tunable frequency and tunable amplitude.

In Example 5, the subject matter of any one of Examples 1-4, wherein the JINJ logic generates the first jitter signal of a first pattern, the first amplitude, and the first frequency responsive to first user input, wherein the JINJ logic generates a second jitter signal of a second pattern, a second amplitude, and a second frequency responsive to a second user input.

In Example 6, the subject matter of any one of Examples 1-5, further comprising: a slicer to receive an analog signal from a transmitter component and to convert the analog signal into digital receiver data; and a phase detector to receive the digital receiver data and to detect phase of the digital receiver data to generate the phase signal.

In Example 7, the subject matter of any one of Examples 1-6, further comprising: a parts per million (PPM) meter comprising: a DCO clock counter to receive the first DCO clock signal and to generate a DCO clock count; and a reference clock counter to receive a reference clock signal and to generate a reference clock count, wherein the PPM meter is to derive, based on a difference between the reference clock count and the DCO clock count, a DCO step size to calibrate the first jitter signal at the first frequency.

In Example 8, the subject matter of any one of Examples 1-7, wherein the first jitter comprises: a staircase wave with variable step size and period; a pseudorandom binary sequence (PRBS) with variable amplitude; or a digital current offset with a variable amplitude.

In Example 9, the subject matter of any one of Examples 1-8, wherein the JINJ logic is to generate a second jitter signal at a second frequency and a second amplitude, wherein the DCO is to generate a second DCO clock signal based on the second jitter signal applied to the DCO control signal, wherein the first DCO clock signal and the second DCO clock signal are used to predict external jitter tolerance of the receiver component.

Example 10 is a method comprising: receiving, by a controller of a clock data recovery (CDR) logic circuit of a receiver component, a phase signal; outputting, by the controller based on the phase signal, a DCO control signal; generating, by jitter injection (JINJ) logic of the CDR logic circuit, a first jitter signal at a first frequency and a first amplitude; receiving, by a digitally controlled oscillator (DCO) of the CDR logic circuit, the first jitter signal applied to the DCO control signal; and outputting, by the DCO based on the first jitter signal applied to the DCO control signal, a first DCO clock signal for on-chip jitter tolerance testing.

In Example 11, the subject matter of Example 10, further comprising: receiving user input indicating the first frequency and the first amplitude, wherein the generating of the first jitter signal is responsive to the receiving of the user input.

In Example 12, the subject matter of any one of Examples 10-11, further comprising: receiving, by a slicer of the receiver component, an analog signal from a transmitter component; converting, by the slicer, the analog signal into digital receiver data; receiving, by a phase detector of the receiver component, the digital receiver data; and detecting, by the phase detector, phase of the digital receiver data to generate the phase signal.

In Example 13, the subject matter of any one of Examples 10-12, further comprising: receiving, by a DCO clock counter of a parts per million (PPM) meter of the receiver component, the first DCO clock signal; generating, by the DCO clock counter, a first DCO clock count; receiving, by a reference clock counter of the PPM meter, a reference clock signal; and generating, by the reference clock counter, a first reference clock count; and determining, by the PPM meter based on the first DCO clock count and the first reference clock count, a first DCO frequency.

In Example 14, the subject matter of any one of Examples 10-13, further comprising: receiving by the DCO clock counter, a second DCO clock signal based on a second jitter signal at a second frequency; generating, by the DCO clock counter, a second DCO clock count; generating, by the reference clock counter, a second reference clock count; determining, by the PPM meter based on the second DCO clock count and the second reference clock count, a second DCO frequency; and deriving, by the PPM meter based on the first DCO frequency and the second DCO frequency, a DCO step size to calibrate the receiver component.

In Example 15, the subject matter of any one of Examples 10-14, further comprising: responsive to applying the first jitter signal at the first frequency and the first amplitude to the DCO control signal, measuring, based on the DCO clock signal, vertical margin of the receiver component; responsive to determining the vertical margin is greater than zero, generating a second jitter signal with a second amplitude that is greater than the first amplitude; responsive to determining the vertical margin is less than zero and the first frequency is not greater than a maximum frequency, generating a third jitter signal with a second frequency that is greater than the first frequency; and responsive to determining the vertical margin is less than zero and the first frequency is greater than the maximum frequency, plotting a Jitter Tolerance Eye (JTE) for on-chip jitter tolerance testing.

In Example 16, the subject matter of any one of Examples 10-15, wherein the first jitter comprises: a staircase wave with variable step size and period; a pseudorandom binary sequence (PRBS) with variable amplitude; or a digital current offset with a variable amplitude.

Example 17 is a system comprising: a transmitter component to transmit an analog signal; a receiver component to receive the analog signal and to generate a phase signal based on the analog signal, the receiver component comprising: clock data recovery (CDR) logic circuit comprising: a controller to receive the phase signal and to output a DCO control signal; jitter injection (JINJ) logic to generate a first jitter signal at a first frequency and a first amplitude; and a digitally controlled oscillator (DCO) to receive the first jitter signal applied to the DCO control signal and to output, based on the first jitter signal applied to the DCO control signal, a first DCO clock signal for on-chip jitter tolerance testing.

In Example 18, the subject matter of Example 17, wherein the JINJ logic is an on-die programmable jitter generator circuit, wherein the JINJ logic is to generate the first jitter signal responsive to receiving user input indicating the first frequency and the first amplitude, wherein the first jitter signal is a periodical pattern with tunable frequency and tunable amplitude.

In Example 19, the subject matter of any one of Examples 17-18, wherein the JINJ logic generates the first jitter signal of a first pattern, the first amplitude, and the first frequency responsive to first user input, wherein the JINJ logic generates a second jitter signal of a second pattern, a second amplitude, and a second frequency responsive to a second user input.

In Example 20, the subject matter of any one of Examples 17-19, wherein the JINJ logic generates the first jitter signal of a first pattern, the first amplitude, and the first frequency responsive to first user input, wherein the JINJ logic generates a second jitter signal of a second pattern, a second amplitude, and a second frequency responsive to a second user input.

Example 21 is an apparatus comprising means to perform a method of any one of Examples 10-16.

Example 22 is at least one machine readable medium comprising a plurality of instructions, when executed, to implement a method or realize an apparatus of any one of Examples 10-16.

Example 23 is an apparatus comprising means for performing the method of any one of Examples 10-16.

Example 24 is an apparatus comprising a processor configured to perform the method of any one of Examples 10-16.

Various embodiments can have different combinations of the structural features described above. For instance, all optional features of the computing system described above can also be implemented with respect to the method or process described herein and specifics in the examples can be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler embodiments, specific expression of algorithms in code, specific power down and gating techniques/logic and other specific operational details of computer system have not been described in detail in order to avoid unnecessarily obscuring the present disclosure.

The embodiments may be described with reference to timestamp validation of components in solid-state memory devices in specific integrated circuits, such as in computing platforms or microprocessors. The embodiments can also be applicable to other types of integrated circuits and programmable logic devices. For example, the disclosed embodiments are not limited to desktop computer systems or portable computers, such as the Intel® Ultrabooks™ computers, and can be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments can especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but can also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible embodiments of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure can be provided as a computer program product or software which can include a machine or computer-readable medium having stored thereon instructions which can be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design can go through various stages, from creation to simulation to fabrication. Data representing a design can represent the design in a number of manners. First, as is useful in simulations, the hardware can be represented using a hardware description language or another functional description language. Additionally, a circuit level model with logic and/or transistor gates can be produced at some stages of the design process. Furthermore, most designs, at some stage, reach a level of data representing the physical placement of various devices in the hardware model. In the case where conventional semiconductor fabrication techniques are used, the data representing the hardware model can be the data specifying the presence or absence of various features on different mask layers for masks used to produce the integrated circuit. In any representation of the design, the data can be stored in any form of a machine readable medium. A memory or a magnetic or optical storage such as a disc can be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider can store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) can refer to the combination of the microcontroller and the non-transitory medium. Often module boundaries that are illustrated as separate commonly vary and potentially overlap. For example, a first and a second module can share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate can provide a 0 or a 1 during operation. But a logic gate 'configured to' provide an enable signal to a clock does not include every potential logic gate that can provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, can be capable of holding a single logical value or multiple logical values. However, other representations of values in computer systems have been used. For example the decimal number ten can also be represented as a binary value of 1010 and a hexadecimal letter A. Therefore, a value includes any representation of information capable of being held in a computer system.

Moreover, states can be represented by values or portions of values. As an example, a first value, such as a logical one, can represent a default or initial state, while a second value, such as a logical zero, can represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values can be utilized to represent any number of states.

The embodiments of methods, hardware, software, firmware or code set forth above can be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that can receive information there from.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics can be combined in any suitable manner in one or more embodiments.

In the foregoing specification, a detailed description has been given with reference to specific exemplary embodiments. It will, however, be evident that various modifications and changes can be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but can refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "outputting," "generating," "converting," "detecting," "determining," "deriving," "applying," "measuring," "plotting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and can not necessarily have an ordinal meaning according to their numerical designation.

What is claimed is:

1. A receiver component comprising:
   clock data recovery (CDR) logic circuit comprising:
      a controller to receive a phase signal and to output a digitally controlled oscillator (DCO) control signal;

jitter injection (JINJ) logic to generate a first jitter signal at a first frequency and a first amplitude responsive to receiving first user input indicating the first frequency and the first amplitude; and a DCO to receive the first jitter signal applied to the DCO control signal and to output, based on the first jitter signal applied to the DCO control signal, a first DCO clock signal for on-chip jitter tolerance testing.

2. The receiver component of claim 1, wherein the controller is a proportional integral (PI) controller.

3. The receiver component of claim 1, wherein the controller is a loop filter.

4. The receiver component of claim 1, wherein the JINJ logic is an on-die programmable jitter generator circuit, wherein the first jitter signal is a periodical pattern with tunable frequency and tunable amplitude.

5. The receiver component of claim 1, wherein the JINJ logic generates the first jitter signal of a first pattern responsive to the first user input, wherein the JINJ logic generates a second jitter signal of a second pattern, a second amplitude, and a second frequency responsive to a second user input.

6. The receiver component of claim 1 further comprising:
a slicer to receive an analog signal from a transmitter component and to convert the analog signal into digital receiver data; and
a phase detector to receive the digital receiver data and to detect phase of the digital receiver data to generate the phase signal.

7. The receiver component of claim 1 further comprising: a parts per million (PPM) meter comprising:
a DCO clock counter to receive the first DCO clock signal and to generate a DCO clock count; and
a reference clock counter to receive a reference clock signal and to generate a reference clock count, wherein the PPM meter is to derive, based on a difference between the reference clock count and the DCO clock count, a DCO step size to calibrate the first jitter signal at the first frequency.

8. The receiver component of claim 1, wherein the first jitter signal comprises:
a staircase wave with variable step size and period;
a pseudorandom binary sequence (PRBS) with a first variable amplitude; or
a digital current offset with a second variable amplitude.

9. The receiver component of claim 1, wherein the JINJ logic is to generate a second jitter signal at a second frequency and a second amplitude, wherein the DCO is to generate a second DCO clock signal based on the second jitter signal applied to the DCO control signal, wherein the first DCO clock signal and the second DCO clock signal are used to predict external jitter tolerance of the receiver component.

10. A method comprising:
receiving, by a controller of a clock data recovery (CDR) logic circuit of a receiver component, a phase signal;
outputting, by the controller based on the phase signal, a digitally controlled oscillator (DCO) control signal;
responsive to receiving first user input indicating a first frequency and a first amplitude, generating, by jitter injection (JINJ) logic of the CDR logic circuit, a first jitter signal at the first frequency and the first amplitude;
receiving, by a DCO of the CDR logic circuit, the first jitter signal applied to the DCO control signal; and outputting, by the DCO based on the first jitter signal applied to the DCO control signal, a first DCO clock signal for on-chip jitter tolerance testing.

11. The method of claim 10 further comprising:
receiving, by a slicer of the receiver component, an analog signal from a transmitter component;
converting, by the slicer, the analog signal into digital receiver data;
receiving, by a phase detector of the receiver component, the digital receiver data; and
detecting, by the phase detector, phase of the digital receiver data to generate the phase signal.

12. The method of claim 10 further comprising:
receiving, by a DCO clock counter of a parts per million (PPM) meter of the receiver component, the first DCO clock signal;
generating, by the DCO clock counter, a first DCO clock count;
receiving, by a reference clock counter of the PPM meter, a reference clock signal; and
generating, by the reference clock counter, a first reference clock count; and
determining, by the PPM meter based on the first DCO clock count and the first reference clock count, a first DCO frequency.

13. The method of claim 12 further comprising:
receiving by the DCO clock counter, a second DCO clock signal based on a second jitter signal at a second frequency;
generating, by the DCO clock counter, a second DCO clock count;
generating, by the reference clock counter, a second reference clock count;
determining, by the PPM meter based on the second DCO clock count and the second reference clock count, a second DCO frequency; and
deriving, by the PPM meter based on the first DCO frequency and the second DCO frequency, a DCO step size to calibrate the receiver component.

14. The method of claim 10 further comprising:
responsive to applying the first jitter signal at the first frequency and the first amplitude to the DCO control signal, measuring, based on the DCO clock signal, vertical margin of the receiver component;
responsive to determining the vertical margin is greater than zero, generating a second jitter signal with a second amplitude that is greater than the first amplitude;
responsive to determining the vertical margin is less than zero and the first frequency is not greater than a maximum frequency, generating a third jitter signal with a second frequency that is greater than the first frequency; and
responsive to determining the vertical margin is less than zero and the first frequency is greater than the maximum frequency, plotting a Jitter Tolerance Eye (JTE) for the on-chip jitter tolerance testing.

15. The method of claim 10, wherein the first jitter signal comprises:
a staircase wave with variable step size and period;
a pseudorandom binary sequence (PRBS) with a first variable amplitude; or
a digital current offset with a second variable amplitude.

16. A system comprising:

a transmitter component to transmit an analog signal;

a receiver component to receive the analog signal and to generate a phase signal based on the analog signal, the receiver component comprising:

clock data recovery (CDR) logic circuit comprising:

a controller to receive the phase signal and to output a digitally controlled oscillator (DCO) control signal;

jitter injection (JINJ) logic to generate a first jitter signal at a first frequency and a first amplitude responsive to receiving first user input indicating the first frequency and the first amplitude; and a DCO to receive the first jitter signal applied to the DCO control signal and to output, based on the first jitter signal applied to the DCO control signal, a first DCO clock signal for on-chip jitter tolerance testing.

17. The system of claim 16, wherein the JINJ logic is an on-die programmable jitter generator circuit, wherein the first jitter signal is a periodical pattern with tunable frequency and tunable amplitude.

18. The system of claim 16, wherein the JINJ logic generates the first jitter signal of a first pattern responsive to the first user input, wherein the JINJ logic generates a second jitter signal of a second pattern, a second amplitude, and a second frequency responsive to a second user input.

19. The system of claim 16, wherein the first jitter signal comprises:

a staircase wave with variable step size and period;

a pseudorandom binary sequence (PRBS) with a first variable amplitude; or a digital current offset with a second variable amplitude.

20. The system of claim 16, wherein the JINJ logic is to generate a second jitter signal at a second frequency and a second amplitude, wherein the DCO is to generate a second DCO clock signal based on the second jitter signal applied to the DCO control signal, wherein the first DCO clock signal and the second DCO clock signal are used to predict external jitter tolerance of the receiver component.

* * * * *